April 18, 1950            E. E. LEE            2,504,268
LAWN MOWER HAVING CIRCULAR BLADES
Filed Dec. 26, 1947            2 Sheets-Sheet 2
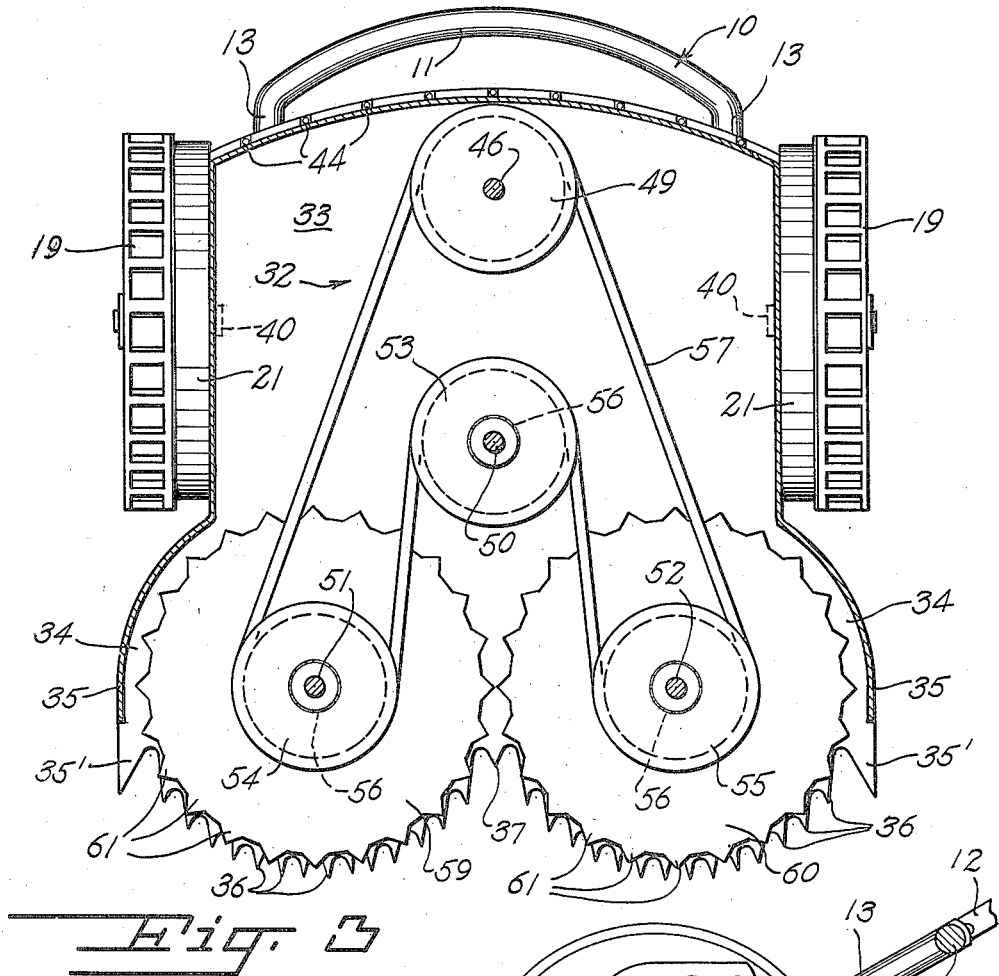
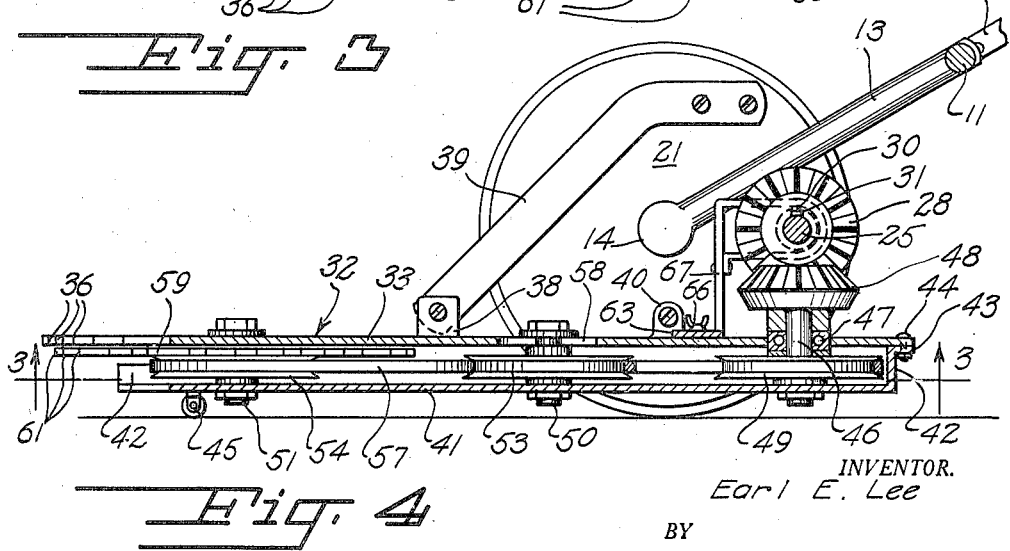
INVENTOR.
Earl E. Lee
BY
McMorrow, Berman & Davidson
Attorneys Patented Apr. 18, 1950

2,504,268

UNITED STATES PATENT OFFICE 2,504,268

LAWN MOWER HAVING CIRCULAR BLADES

Earl E. Lee, Hayes, Kans.

Application December 26, 1947, Serial No. 793,980

3 Claims. (Cl. 56—255)

My invention relates to improvements in lawn mowers of the type having circular rotary cutter blades.

A primary object of the invention is to provide a manually-operated lawn mower, adapted to cut grass of any height, and particularly well adapted to cut tall tough grass.

A further object of the invention is to provide a lawn mower which is light and easy to push.

A still further object of the invention is to provide a lawn mower of the above mentioned class, which is simplified and practical in design, durable, and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a plan view of the lawn mower embodying the invention, the handle being broken away, part in horizontal section.

Figure 3 is a bottom plan view of the invention taken on line 3—3 of Figure 4.

Figure 4 is a central vertical longitudinal section taken on line 4—4 of Figure 1.

Figures 1, 2:
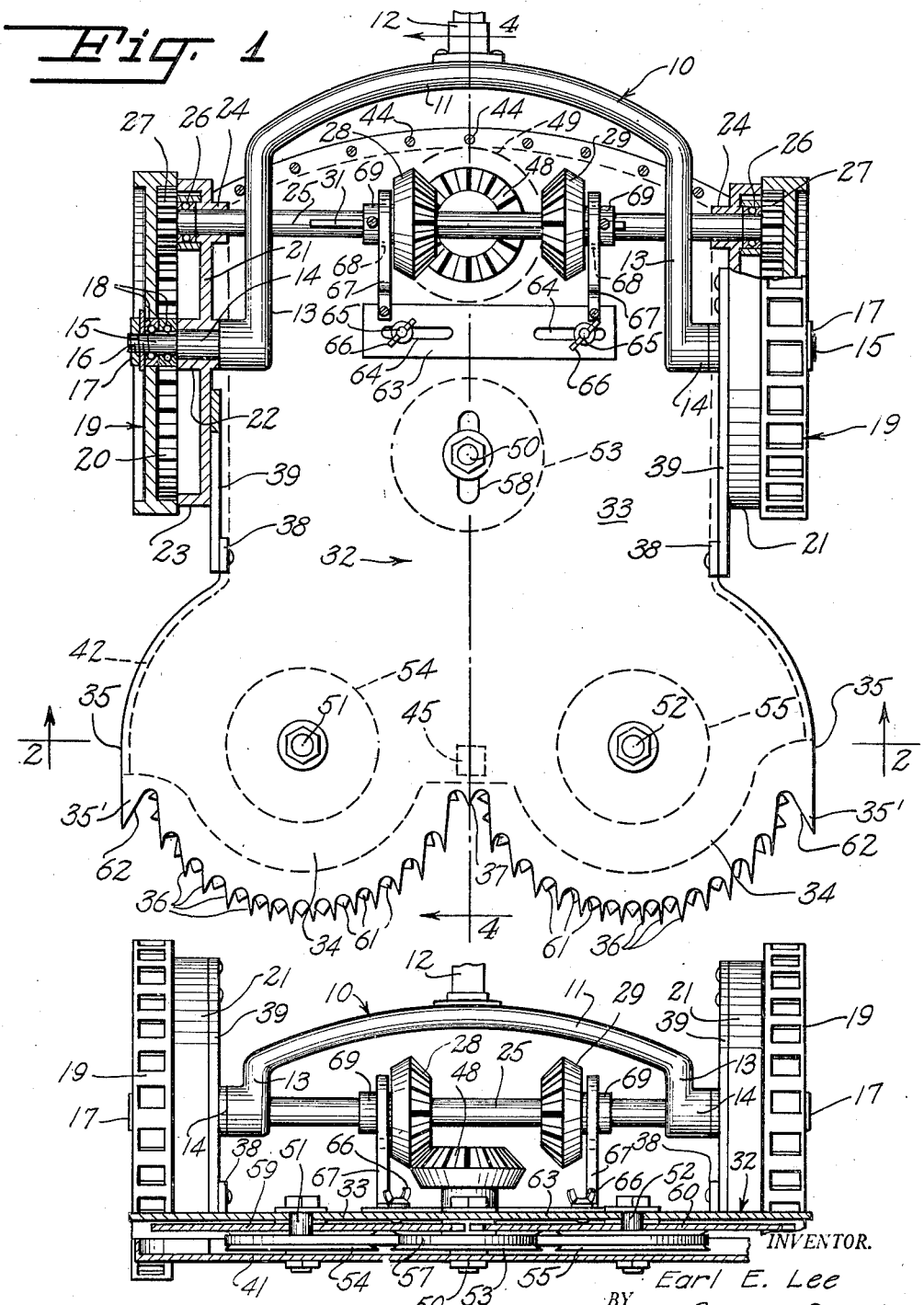
Figure 2 is a transverse vertical section taken on line 2—2 of Figure 1.

In the drawings, where for the purpose of the illustration is shown a preferred embodiment of the invention, the numeral 10 designates an upwardly and rearwardly inclined pivoted yoke, including a generally horizontal cross bar 11, having a lawn mower handle 12 rigidly secured thereto at the transverse center of the lawn mower. The yoke 10 further includes straight side 13, provided at their lower ends with laterally outwardly extending horizontal axles 14, which are in axial alignment.

Each axle 14 carries a reduced outer extension 15, integral therewith, and screw-threaded at its outer end 16, to receive a nut 17. Ball-bearings 18 are mounted upon each reduced extension 15, inwardly of the nut 17. Ground-engaging drive wheels 19 are mounted upon the outer races of ball-bearings 18, as shown, and these wheels 19 include inwardly disposed annular ring gears 20, integral therewith. The wheels 19 are, of course, freely rotatable. Disposed adjacent to the inner side of each wheel 19, and mounted upon the axles 14, are non-rotatable circular discs 21, having central hubs 22, engaging over axles 14, as shown. The discs 21 also include outer annular flanges 23, having their outer edges disposed adjacent to the inner sides of wheels 19.

Formed upon each disc 21, near its outer periphery is a laterally-projecting tubular boss 24, which receives one end of a horizontal transverse rotatable shaft 25. The shaft 25 has its outer ends journaled in ball-bearings 26. Rigidly secured to the outer ends of shaft 25 for rotation therewith are pinions 27, which mesh with ring gears 20, and are driven thereby. Mounted upon the shaft 25, near its center portion for rotation with the same are a pair of axially-shiftable bevel gears 28 and 29. The gears 28 and 29 have axial keyways 30, to slidably receive an elongated key 31, secured to shaft 25.

Disposed between the discs 21, and close to the ground is a relatively thin flat pulley housing, designated generally by the numeral 32. This pulley housing 32 comprises a top guard plate 33, which is flat and thin and extends for substantially the full distance between discs 21, and from a point adjacent to the rear edges of wheels 19 forwardly, as shown. Forwardly of the wheels 19, the guard plate flares laterally outwardly at both sides to form a pair of circularly curved forward end portions 34. The outer sides 35 of portions 34 are disposed laterally outwardly of the wheels 19, and the portions 34 are provided with forwardly-projecting pointed guide teeth or members 35', adapted to contact the sides of curbing, tombstones, trees, and the like, and to guide the mower along the same, so that grass may be cut very close to such objects. Inwardly of the guide teeth 35', the portions 34 have circumferentially spaced shearing teeth 36, to coact with rotary cutting elements, to be described, for cutting tough tall grass, and the like. The teeth 36 of each portion 34 extend about the forward circularly curved ends of the portions and converge to the point between the two portions 34, where a single tooth 37 may be formed.

Adjacent to the forward edges of wheels 19, the guard plate 33 has side upstanding apertured lugs 38 formed upon it. Rigid rearwardly inclined brackets 39 are rigidly secured at their lower ends to lugs 38, and at their top ends to the inner sides of discs 21. The brackets serve to partially support the guard plate 33, and to hold the discs 21 against rotation. Directly beneath the axles 14, the guard plate 33 has additional side vertical lugs 40, and these lugs 40 are rigidly secured to the inner sides of discs 21 and serve to support the rear portion of guard plate 33.

The pulley housing 32 further comprises a bottom plate 41, which is generally flat and horizontal, and spaced downwardly from guard plate 33 to form a relatively narrow space between the two plates. The bottom plate 41 conforms generally to the shape of top guard plate 33, but terminates short of the forward end of guard plate 33, as shown dotted in Figure 1. The forward end of bottom plate 41 has a contour which is parallel to the curved forward end of guard plate 33, as shown. At its marginal edges, bottom plate 41 has an upstanding vertical flange 42, which extends completely around both sides of plate 41, and across the rear end of the same. At its rear side, the flange 42 carries a horizontal top flange 43, which extends completely across the rear end of plates 33 and 41, and the flange 43 is rigidly secured to guard plate 33 by screws 44, or the like. Near its forward edge, and at the transverse center of the mower, the bottom plate 41 carries a depending ground-engaging swiveled roller or caster 45, serving to support the forward end of pulley housing 32, as the mower is pushed over the ground.

Rotatably mounted upon the pulley housing 32, at the transverse center of the mower, and disposed directly below shaft 25, is a short vertical shaft 46, suitably journaled in a ball-bearing 47, or ball-bearings, and having rigidly secured to its top end a bevel gear 48, adapted to mesh with either of gears 28 or 29, to be driven thereby. The rotatable shaft 46 carries a grooved pulley 49, secured to it for rotation therewith, and this pulley is disposed in the space between plates 33 and 41, as shown. The shaft 46 is suitably held against axial movement with respect to pulley housing 32. Also mounted upon the pulley housing 32 and extending through plates 33 and 41, and securely held against rotation and axial movement with respect to the housing, are short, vertical shafts 50, 51 and 52. The shaft 50 is disposed at the transverse center of the mower, and spaced forwardly from shaft 46, as shown. The shafts 51 and 52 are disposed at the centers of circularly curved portions 34. Rotatably mounted upon the shafts 50, 51 and 52, and disposed between the plates 33 and 41 are grooved pulleys 53, 54 and 55, each being provided with a ball-bearing 56, to insure the free rotation of the pulleys upon their shafts. A driving V-belt 57 engages about the pulleys 49, 53, 54 and 55, as shown clearly in Figure 3. Longitudinally extending slots 58 are provided in plates 33 and 41 for shaft 50, so that pulley 53 may be adjusted to vary the tension of belt 57. Mounted upon each of the shafts 51 and 52, above the pulleys 54 and 55 are flat circular cutter blades 59 and 60. These blades are adapted to rotate with shafts 51 and 52, and are disposed in close spaced relation to the under side of guard plate portions 34, and concentric therewith.

The cutter blades 59 and 60 have cutting teeth 61, which coact with the stationary teeth 36 of portions 34 to cut grass, and the like. The diagonal inner edges 62 of guide teeth 35' serve to guide grass close to a curbing, or the like, into contact with the coacting teeth 36 and 61.

Means are provided to reverse the direction of rotation of cutter blades 59 and 60, so that the same may be removed and turned over, so that both sides of the same may be utilized. Such means includes a laterally adjustable plate 63 having longitudinal slots 64, to receive studs 65 which are secured to plate 33. Wing nuts 66 are carried by studs 65, and serve to clamp plate 63 in the selected position. Rigidly secured to plate 63, by any suitable means are a pair of upstanding arms or brackets 67 having transverse openings 68 which slidably receive the hubs 69 of gears 28 and 29 which rotate within the openings 68. As shown in Figure 1, with the plate 63 shifted to the right, the gear 28 meshes with gear 48, to drive the cutter blades 59 and 60 in one direction. When the plate 63 is shifted to the left, the gear 28 is shifted out of mesh with gear 48, and gear 29 enters into mesh with it, to drive the cutter blades in the opposite direction. The hubs 69 cannot move axially relative to arms 67, but are freely rotatable in the openings 68, as stated.

In use, the device is operated like any manually operated mower, and is easy to push through very tall tough grass. The mower is useful to cut grass growing close to walls, curbing, sidewalks, and the like.

It is to be understood that the form of the invention herewith shown and described, is to be taken as a preferred example of the same, and that various changes in the shape, size and arrangement of parts may be resorted to, without departing from the spirit of the invention, or the scope of the sub-joined claims.

What is claimed is:

1. A lawn mower, comprising a handle including transverse axle extensions, ground engaging wheels rotatably mounted upon the axle extension, non-rotatable upstanding discs mounted upon the axle extensions inwardly of the wheels and spaced from the wheels and having openings, a transverse shaft rotatably mounted within the openings of the discs and extending between the discs and wheels and having parts which engage the wheels and rotated thereby, a thin flat casing including spaced top and bottom plates extending between the discs and secured to the discs, the casing being disposed close to the ground and extending forwardly of the front edges of the wheels and laterally outwardly of the wheels upon both sides of the lawn mower, the forward end of the casing being open, the casing being provided with teeth in the forward edge of one of said plates, rotary cutters mounted between the plates of the casing and forwardly of the wheels and having teeth to coact with the teeth of the casing, a gear mounted upon the transverse shaft for rotation therewith, a second gear mounted upon the casing adjacent to the gear and meshing with the gear, the second gear having a spindle projecting between the plates of the casing, and driving connecting means mounted between the plates of the casing and operatively connecting the rotary cutters and spindle of the second gear.

2. A lawn mower, comprising a handle including axle extensions, ground engaging wheels rotatably mounted upon the axle extensions, non-rotatable plates mounted upon the axle extensions inwardly of the wheels and having openings, a shaft rotatably mounted within the openings and extending through the plates and having parts engaging the wheels and rotated thereby, a thin flat casing including spaced top and bottom plates extending between the plates and secured to the discs and arranged close to the ground, the casing extending forwardly of the front edges of the wheels and laterally outwardly of the wheels upon both sides of the lawn mower, the forward end of the casing being open, the casing being provided with teeth in the forward edge of one of said casing plates, rotary substantially flat cutters mounted between the casing plates near the forward edges thereof and having teeth to coact with the teeth of the casing, belt and pulley means mounted between the casing plates and operatively connected with the cutters for rotating them, and gearing operatively connecting the shaft and belt and pulley means.

3. In a lawn mower, a non-rotatable axle, ground engaging wheels rotatably mounted upon the axle near the opposite ends thereof, a thin flat casing including spaced top and bottom plates mounted upon the non-rotatable axle and disposed beneath the same and close to the ground, the casing extending between the wheels and forwardly of the wheels for a substantial distance, the casing being laterally enlarged forwardly of the wheels so that the sides of the casing project laterally outwardly of the wheels, the forward end of the casing having its forward edge provided with cutting teeth forming a relatively stationary cutting element extending for substantially the full distance beween the sides of the casing adjacent to its open forward end, a pair of laterally spaced rotary cutters mounted between the casing plates forwardly of the wheels and having teeth which coact with the teeth of the casing across substantially the full width of the open forward end of the casing so that the mower can cut a path wider than the distance between the wheels, gearing mounted between the plates of the casing and operatively connected with the rotary cutters, and driving connecting means between the wheels and gearing.

EARL E. LEE.

REFERENCES CITED

The following references are of record in the file of this patent:

UNITED STATES PATENTS

| Number | Name | Date |
| --- | --- | --- |
| 2,132,465 | Gast | Oct. 11, 1938 |
| 2,134,115 | Flammang | Oct. 25, 1938 |
| 2,267,944 | Osterholm | Dec. 30, 1941 |